Dec. 1, 1942.　　　　P. R. CARLTON　　　　2,303,722
PISTON RING
Filed Jan. 29, 1940　　　　2 Sheets-Sheet 1

INVENTOR.
PAUL R. CARLTON
BY
ATTORNEY.

Dec. 1, 1942.  P. R. CARLTON  2,303,722
PISTON RING
Filed Jan. 29, 1940  2 Sheets-Sheet 2

INVENTOR.
PAUL R. CARLTON
BY
ATTORNEY.

Patented Dec. 1, 1942

2,303,722

UNITED STATES PATENT OFFICE 2,303,722

PISTON RING

Paul R. Carlton, St. Louis, Mo., assignor to Charles C. Wenkel, Columbia, Ill.

Application January 29, 1940, Serial No. 316,061

1 Claim. (Cl. 309—45)

This invention relates to a certain new and useful improvement in piston rings.

My invention has for its primary objects the provision of a composite ring uniquely constructed for scraping lubricating oil from the cylinder wall on the reciprocating strokes of the piston and returning the scraped lubricants to the engine crank case through suitable passages or ducts provided for the purpose in the piston.

My invention has for a further object the provision of a composite ring of the type and for the purpose stated which may be cheaply and inexpensively constructed, which is durable, rugged, heat-resistant, and sufficiently yielding or resilient for maintaining an accurate fit against the cylinder wall over wide ranges of temperature and other motor conditions, and which is exceedingly efficient in the performance of its intended functions.

And with the above and other objects in view, my invention resides in the novel features of form, construction, arrangement, and combination of parts presently described and pointed out in the claim.

In the accompanying drawings (2 sheets),

Figure 1:
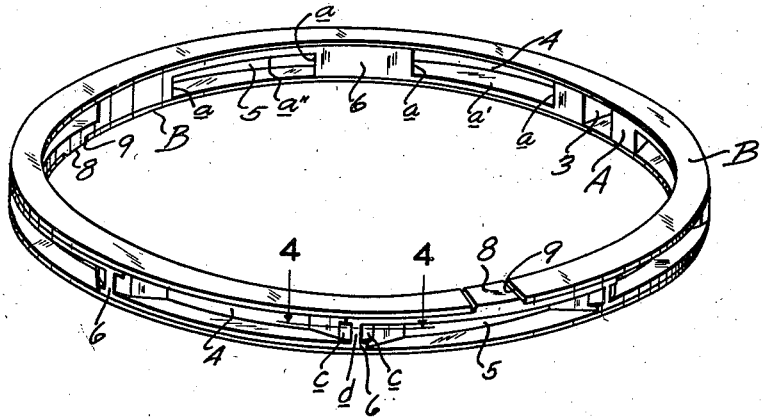
Figure 1 is a perspective view of a composite piston ring constructed in accordance with and embodying my present invention.

Referring now more in detail and by reference characters to the drawings, which illustrate practical embodiments of my invention, the composite piston ring includes an intermediate member or annulus A fabricated from cast-iron, cast-steel, or other suitable material, as desired, in the form of a slightly epicycloidal split ring having opposite flat end faces 1, 2, and a circumferential gap 3.

Formed in the member or annulus A from its one or so-called upper end face 1, is a circumferential series of uniformly spaced slots or channels, as at 4, each having obliquely outwardly flaring opposite end walls $a$ and a bottom wall $a'$.

Formed in the member or annulus A from its opposite or so-called lower end face 2, is a similar circumferential series of uniformly spaced slots or channels, as at 5, staggered circumferentially of the annulus A with respect to the slots or channels 4 and each likewise having obliquely outwardly flaring opposed end walls $a$ and a top wall $a''$.

Figure 2:
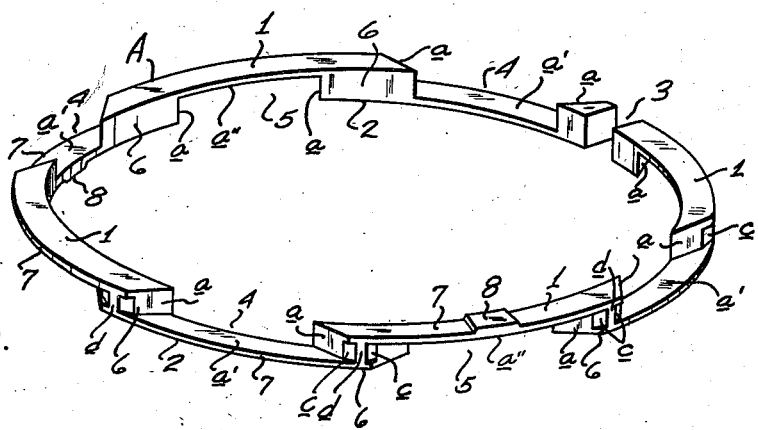
Figure 2 is a perspective view of the intermediate annulus or member of the ring.

The slots 4, 5, are preferably identical in depth with respect to the thickness of the member A and also in circumferential length, the member A being thus, as it may be said, a split ring integrally comprising a plurality of circumferentially spaced prism-shaped sections 6 connected or joined alternately by upper and lower ring end-face sections 7, all as best seen in Figure 2.

On the outer face of the member A, the prism-shaped sections 6 are obliquely cut-away or relieved, as at $c$, a relatively circumferentially narrow web $d$ remaining in the plane of the outer faces of the respective end-face sections 7. Thus, the outer face of the annulus A, which, during reciprocations of the piston, is in heat-conductive engagement with the cylinder wall, is greatly reduced in area, and the sharpness of the oil-scraping action of the ring is increased.

The intermediate member or annulus A is also provided upon its opposite end faces 1, 2, with an outwardly presented segmental shoulder or abutment 8 preferably positioned on opposite sides of the ring-gap 3 and centrally of selected end sections 7, as shown, the shoulders or abutments 8 preferably having a height or thickness substantially equal to the thickness of the end-face sections 7.

Figure 3:
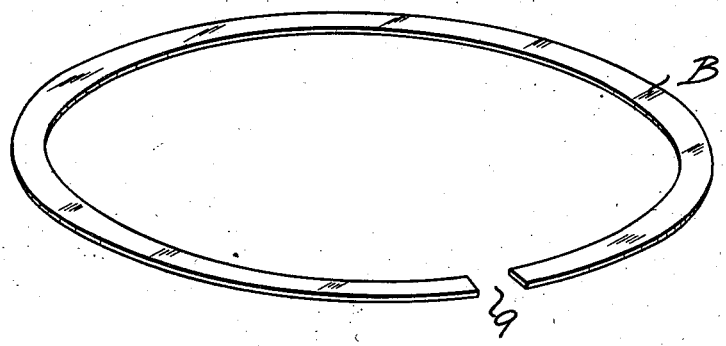
Figure 3 is a perspective view of one of the end members of the ring.
Figure 4:
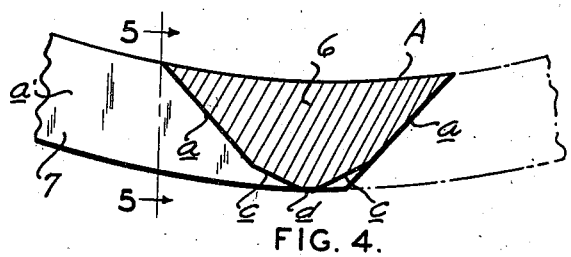
Figure 4 is a fragmentary transverse sectional view of the ring, taken approximately along the line 4—4, Figure 1.
Figure 5:
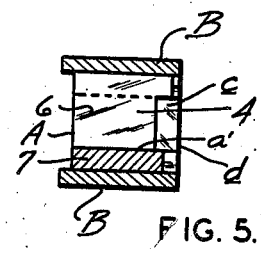
Figure 5 is a sectional view of the ring, taken approximately along the line 5—5, Figure 4.

Co-operable with the annulus A, are two substantially similar outer members or annuli B, B, preferably fabricated from ribbon steel in the form of slightly epicycloidal split rings each having a circumferential gap, as at 9, normally somewhat longer in circumferential extent than the corresponding circumferential length of the respective shoulders or stops 8, each annulus or ring B having a transverse width or thickness substantially equal to the thickness of the respective end-face sections 7 of the annulus A, as best seen in Figures 1 and 3.

The composite ring is formed by superposing an outer ring or annulus B upon each of the opposite end faces 1, 2, of the intermediate annulus A, the outer rings or annuli B loosely at their respective gaps or splits 9 engaging the shoulders or stops 8 and being hence prevented from slipping or shifting upon the annulus A, and the rings B being accordingly prevented from assuming or taking, in the reciprocations of the piston, such position upon the annulus A that their gaps or splits 9 register or align.

In use and operation, the annulus A securely forces the outer rings B into engagement with the lands of the piston ring groove and also against the cylinder wall. At the same time, the intermediate annulus A, by reason of its respective slots or channels 4, 5, provides ample drainage space for permitting the lubricating oil to flow radially through the ring groove and into the oil drainage ducts of the piston wall.

Further, when the composite ring is installed in a piston groove, the slots 4 upon one end face are upwardly presented and the slots 5 on the opposite end face are downwardly presented, as it may be said, with respect to the piston and its cylinder. Hence, the composite ring presents scraping surfaces which are efficiently operative both on the upward and downward reciprocations of the piston and function to accelerate the flow of oil to the piston ducts irrespective of the direction of movement of the piston. I may add that, by reason of the limited area of the outwardly presented circumferential surface of the member A, which is axially in contact with the cylinder wall during piston reciprocations, the member A is consequently less sensitive to wear and heat.

Figure 6:
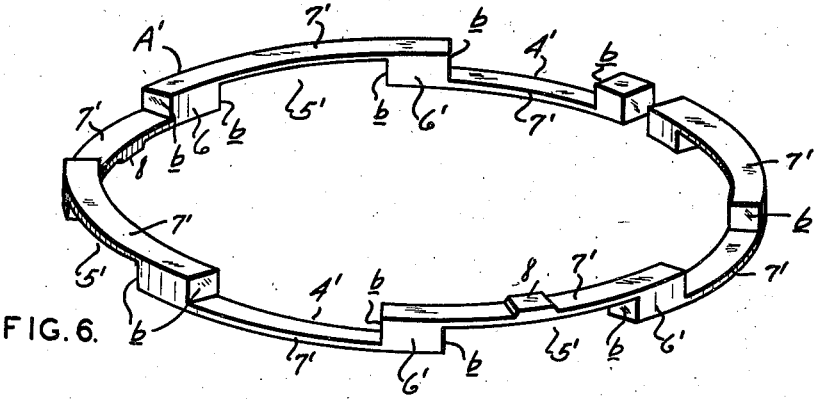
Figures 6 and 7 are perspective views of modified forms of the intermediate member of the ring.
Figure 7:
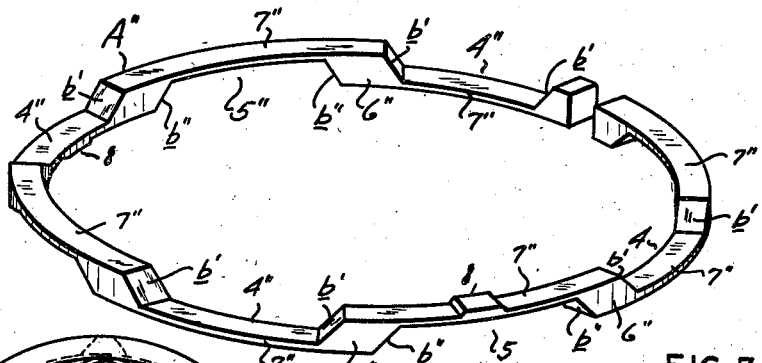

Figures 6 and 7 illustrate slightly modified forms of intermediate members that may readily be substituted as and for the preferred annulus A. The annulus A', specifically shown in Figure 6, is substantially identical in form and structure with the annulus A, except that the end face slots 4', 5', have radial, rather than obliquely flaring, end walls $b$. Thus, the annulus A' is, in effect, a split ring integrally including a plurality of circumferentially spaced block-like segmental sections 6' connected or joined alternately by upper and lower ring end-face sections 7'.

The annulus A'', specifically shown in Figure 7, is also substantially similar in form and structure to the preferred annulus A, the annulus A'' having a plurality of oppositely presented end face slots or channels 4'', 5''; the slots or channels 4'' being provided with end walls $b'$ obliquely flaring toward the end face 1 and the opposite slots or channels 5'' being similarly provided with end walls $b''$ obliquely flaring toward the opposite end face 2 of the ring. Thus, the annulus A'' is, in effect, a split ring integrally including a plurality of circumferentially spaced trapezoidally shaped segmental sections 6'' connected or joined alternately by upper and lower ring end-face sections 7''.

Figure 8:
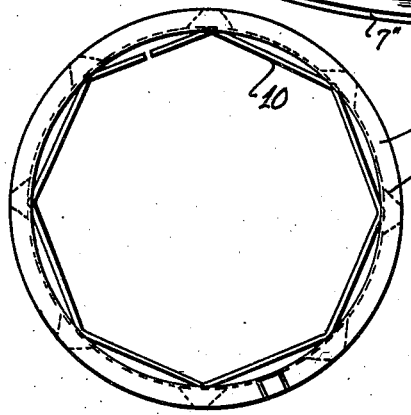
Figure 8 is an end view of the composite ring equipped with an expander.

As shown in Figure 8, a conventional polygonally shaped spring steel expander 10, having an axial width substantially the same as the axial thickness of either of the respective intermediate members A, A', or A'', may be yieldingly disposed within such member for increasing the normal expansion thereof.

Thus, by my invention, I provide a composite piston ring combining in one structure all of the several advantages of steel and cast-iron piston rings for effecting unique oil-scraping and draining action.

It should be understood that changes and modifications in the form, construction, arrangement, and combination of parts of the piston ring may be made and substituted for those herein shown and described without departing from the nature and principle of my invention.

Having thus described my invention, what I claim and desire to secure by Letters Patent is,

In a composite piston ring, an intermediate member comprising a split ring having oppositely presented end faces, the ring being cut away upon one of said end faces in the provision of a series of spaced grooves having outwardly flaring side-walls, said ring also being cut away upon the other of said end faces in the provision of a second series of grooves each of which is positioned between two of the first-named grooves and likewise having outwardly flaring side-walls, the residual portions between the grooves having the form of prism-shaped pillars and the residual portions between the pillars having the form of flat segments, said segments and said pillars presenting a continuous peripheral cylinder-contacting face which is substantially smaller in area than the inwardly presented face thereof for reducing the area of heat-conductive contact between the ring and the cylinder wall.

PAUL R. CARLTON.